(12) United States Patent
Dolan

(10) Patent No.: US 7,401,798 B2
(45) Date of Patent: Jul. 22, 2008

(54) TAILGATE LADDER

(75) Inventor: Rex Howard Dolan, Carthage, MS (US)

(73) Assignee: Engineering Services Inc., Brandon, MS (US)

( * ) Notice: Subject to any disclaimer, the term of this patent is extended or adjusted under 35 U.S.C. 154(b) by 105 days.

(21) Appl. No.: 11/261,879

(22) Filed: Oct. 28, 2005

(65) Prior Publication Data

US 2007/0096422 A1 May 3, 2007

(51) Int. Cl.
*B60R 3/00* (2006.01)
(52) U.S. Cl. .......................... 280/163; 280/166; 182/97
(58) Field of Classification Search ................. 280/163, 280/164.1, 164.2, 166, 169; 182/152–177
See application file for complete search history.

(56) References Cited

U.S. PATENT DOCUMENTS

| | | | | | |
|---|---|---|---|---|---|
| 3,865,399 | A | * | 2/1975 | Way ............................ | 280/166 |
| 3,997,211 | A | * | 12/1976 | Graves ........................ | 296/162 |
| 4,161,997 | A | * | 7/1979 | Norman ....................... | 182/93 |
| 4,264,084 | A | * | 4/1981 | Telles ......................... | 280/166 |
| 4,757,876 | A | * | 7/1988 | Peacock ...................... | 182/95 |
| 5,205,603 | A | * | 4/1993 | Burdette, Jr. ................. | 296/62 |
| 5,549,312 | A | * | 8/1996 | Garvert ....................... | 280/166 |
| 5,617,930 | A | * | 4/1997 | Elia ............................ | 182/97 |
| 6,003,633 | A | * | 12/1999 | Rolson ........................ | 182/127 |
| 6,116,378 | A | * | 9/2000 | Barrow ........................ | 182/127 |
| 6,270,139 | B1 | * | 8/2001 | Simpson ...................... | 296/62 |
| 6,499,564 | B2 | * | 12/2002 | Puglisi ........................ | 182/150 |
| 6,631,938 | B1 | * | 10/2003 | Burns .......................... | 296/64 |
| 6,905,158 | B1 | * | 6/2005 | Bastian ........................ | 296/62 |
| 6,942,271 | B1 | * | 9/2005 | Jamison et al. ............... | 296/61 |
| 7,080,713 | B1 | * | 7/2006 | Riggs .......................... | 182/127 |
| 2004/0232649 | A1 | * | 11/2004 | Lambie ....................... | 280/163 |

* cited by examiner

*Primary Examiner*—Christopher Ellis
*Assistant Examiner*—Katy Meyer
(74) *Attorney, Agent, or Firm*—Lawrence E. Laubscher, Jr.

(57) ABSTRACT

A ladder assembly for a pick-up truck is pivotally connected with the truck tailgate for movement between a stowed position where the ladder assembly is held against the tailgate and an operable position when the tailgate is lowered and the ladder assembly extends between the tailgate and the ground. A linkage assembly connects the ladder assembly with a mounting plate connected with the tailgate. The linkage assembly spaces the ladder assembly from the tailgate when the ladder assembly is in the operable condition, allows the angle of the ladder assembly relative to the tailgate to vary in accordance with the height of the tailgate relative to the ground, and prevents the ladder assembly from pivoting past a normal position relative to the ground. A handle is also pivotally connected with a side wall of the truck adjacent to the tailgate to assist a user with climbing the ladder assembly into the bed of the truck.

13 Claims, 2 Drawing Sheets

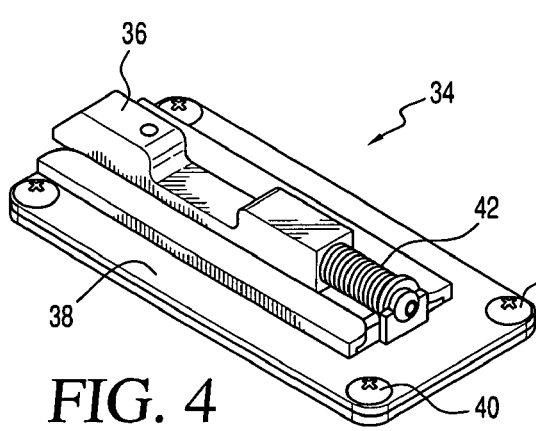
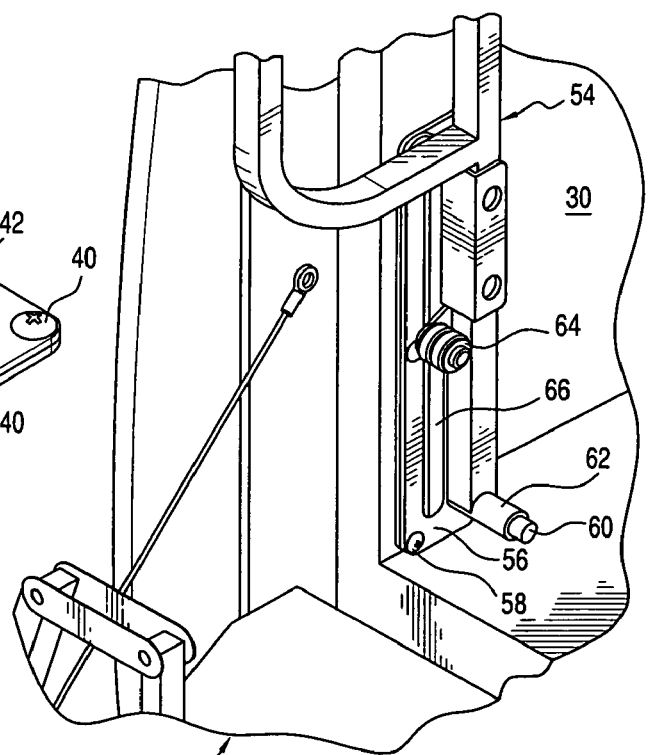
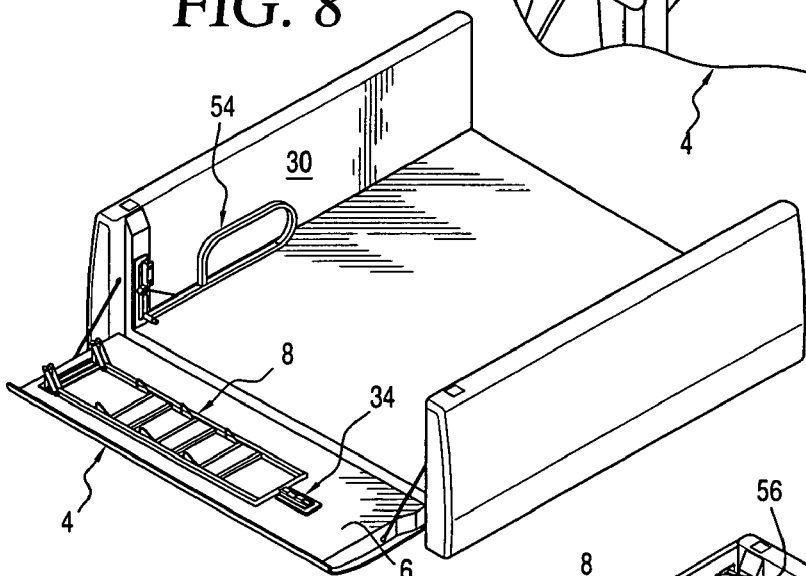
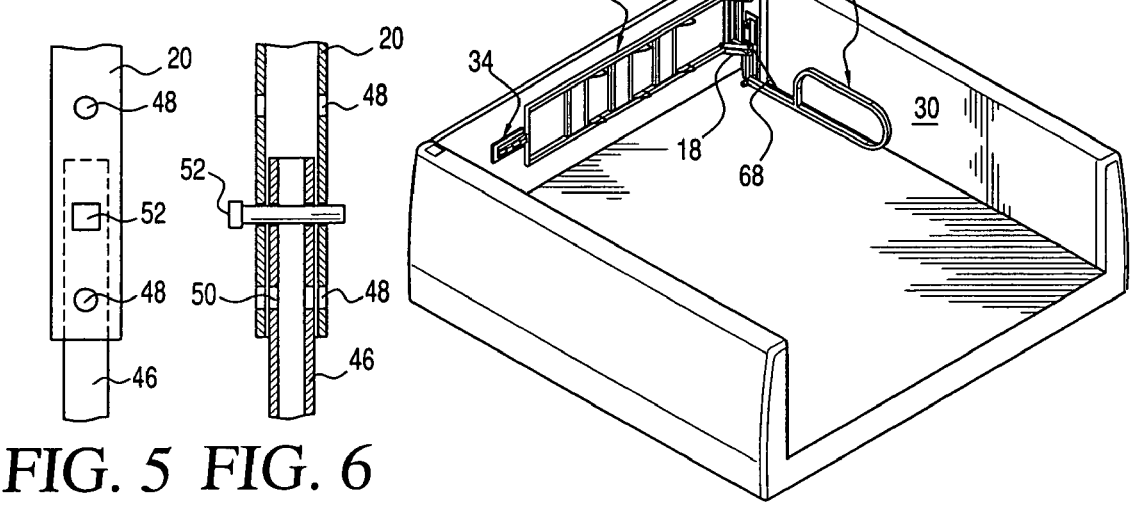
FIG. 4
FIG. 7
FIG. 8
FIG. 5   FIG. 6
FIG. 9

TAILGATE LADDER

BACKGROUND OF THE INVENTION

Most pick-up trucks have tailgates which close the truck bed. The tailgates are normally pivotally connected with the truck body and operate between an upright closed position and a lower open position. A cable is connected between the truck body and the side edges of the tailgate to prevent the tailgate from being lowered past a horizontal position. It is often necessary for a person to enter the truck bed. In order to do so, the person normally climbs over the tailgate when the tailgate is in the open position. This can become difficult for less agile people or where the tailgate is at a significant height above the ground. The present invention relates to a ladder assembly which is connected with the tailgate to afford easy access to the truck bed.

BRIEF DESCRIPTION OF THE PRIOR ART

Ladders for tailgates are well-known in the patented prior art as evidenced by the U.S. patents to Peacock U.S. Pat. No. 4,757,876, Garvert U.S. Pat. No. 5,549,312 and Rolson U.S. Pat. No. 6,003,633. The Peacock patent, for example, discloses a folding ladder that is connected with a truck tailgate via hinges for movement between an open position when the ladder is in use and a folded position for storing the ladder when not in use.

While the prior devices normally operate satisfactorily, they suffer from a number of drawbacks. One drawback is that the prior art truck ladders do not accommodate truck tailgates at different heights from the ground. Another drawback is that the hinge connections do not space the ladder from the tailgate, often resulting in damage to the tailgate when the ladder is in the operable position. The present invention was developed in order to overcome these and other drawbacks by providing an improved tailgate ladder which is easy to use, accommodates different heights relative to the ground, protects the tailgate when in use and stows to a convenient position which does not interfere with the interior of the truck bed.

SUMMARY OF THE INVENTION

The tailgate ladder according to the invention includes a mounting plate secured to the side edge portion of the inner surface of the tailgate. The mounting plate has a pair of posts which extend normal to the tailgate inner surface. Connected with the tops of the posts is a linkage assembly which in turn is connected with the upper ends of the legs of a ladder assembly, so that the ladder assembly is pivotally connected with posts the mounting plate. The ladder is thus movable between a stowed position where the ladder rests against the tailgate and an operable position where the ladder extends from the posts to the ground at an angle relative to the open tailgate. The linkage assembly includes a pair of links having a length generally corresponding to the length of the posts to space the ladder assembly from the tailgate edge when the ladder assembly is in the operable condition and to allow the angle of the ladder assembly relative to the tailgate to be altered to accommodate different heights of the tailgate relative to the ground. Preferably, the links include stops which prevent pivotal movement of the ladder beyond a position normal to the tailgate.

According to a preferred embodiment of the invention, the ladder includes a plurality of spaced steps which are pivotally connected with the legs of the ladder. The steps are thus pivoted to a position parallel to the tailgate surface when the ladder is in the stowed position.

According to another embodiment of the invention, a handle is pivotally connected with the interior rear portion of a truck side wall for movement between an upright operable position when the tailgate is lowered and a horizontal stowed position when the tailgate is raised to its closed position. A cable is connected between the handle and the tailgate, and a spring-hinge connects the handle with the side wall to bias the handle to its horizontal stowed position.

BRIEF DESCRIPTION OF THE FIGURES

Other objects and advantages of the invention will become apparent from a study of the following specification when viewed in the light of the accompanying drawings, in which:

FIG. 4 is detailed perspective view showing the mounting plate and linkage assembly for the tailgate ladder;

FIGS. 5 and 6 are partial plan and sectional views, respectively, of a telescoping ladder leg of the tailgate ladder;

FIG. 7 is a detailed perspective view of the connection between the handle, the truck side wall and the tailgate; and FIGS. 8 and 9 are perspective views of the handle in the stowed position with the tailgate lowered and raised, respectively.

DETAILED DESCRIPTION

Figure 1:
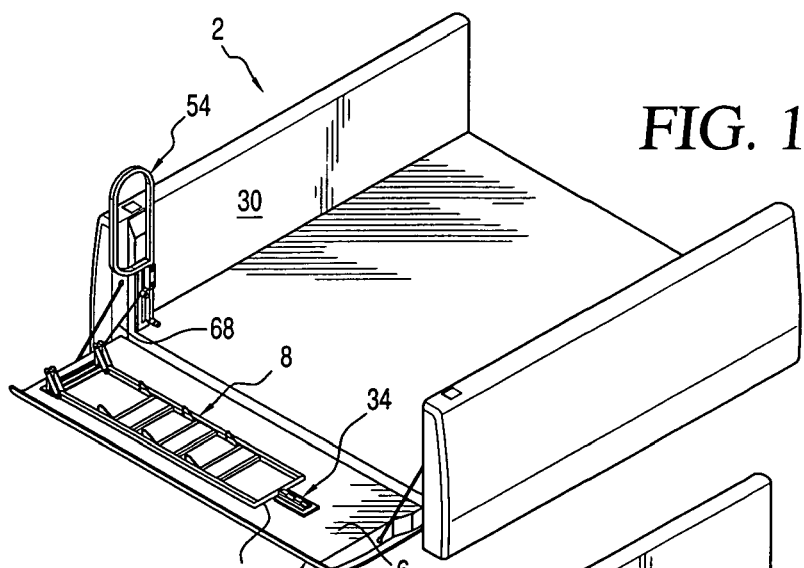
FIGS. 1 and 2 are perspective views of a pick-up truck bed and tailgate showing the tailgate ladder according to the invention in its stowed and operable positions, respectively.
Figure 2:
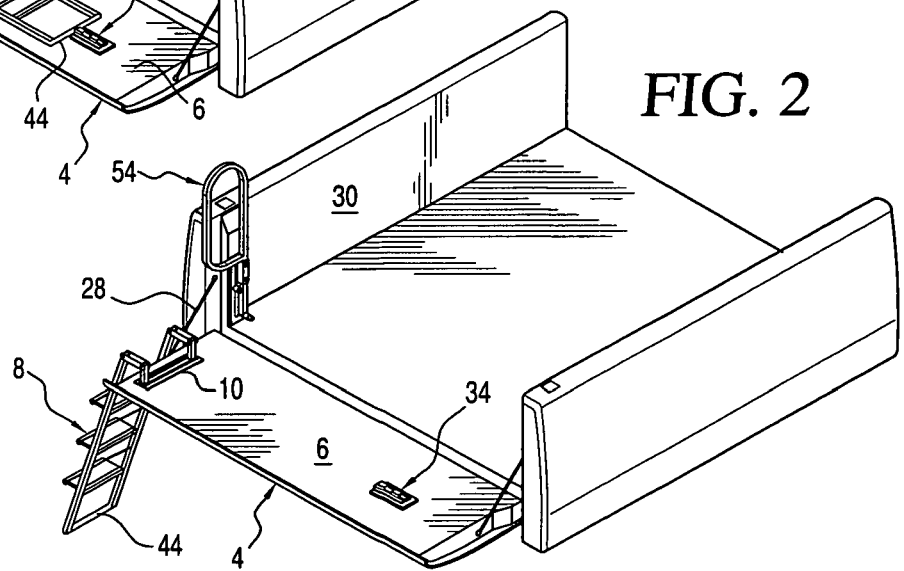

FIG. 1 shows the truck bed for a pick-up truck 2 having a tailgate 4 which is operable between the open position as shown and a closed position which encloses the truck bed. The tailgate has an interior surface 6 on with which a ladder assembly 8 is connected. As will be developed in greater detail below, the ladder assembly is operable between a stowed position wherein the ladder assembly rests against the tailgate as shown in FIG. 1 and an operable position wherein the ladder assembly extends from the tailgate to the ground as shown in FIG. 2.

Figure 3:
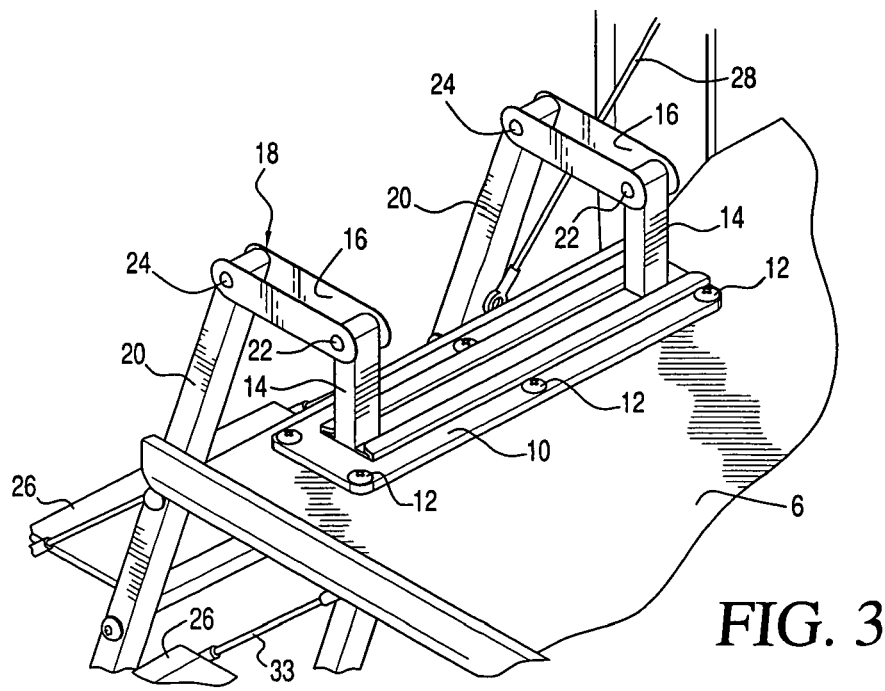
FIG. 3 is a detailed perspective view of the latch mechanism for the tailgate ladder of FIGS. 1 and 2.

A mounting plate 10 is connected with the interior surface of the tailgate adjacent to a side edge portion of the tailgate as shown in detail in FIG. 3. Any suitable fasteners such as screws 12 can be used to connect the mounting plate. Extending upwardly from the plate are a pair of space posts 14. Pivotally connected with each post is a link 16 of a linkage assembly 18. The other ends of the links are pivotally connected with upper ends of the legs 20 of the ladder assembly. Bearings 22 (or pivot pins) connect the links with the posts and similar bearings 24 (or pins) connect the links with the ladder assembly legs. A plurality of steps 26 are connected between the legs of the ladder in spaced relation. The mounting plate, ladder, and linkage assemblies are all formed of a durable rigid material such as synthetic plastic or metal.

The linkage assembly is designed to allow the ladder to be pivoted by the user between the stowed and operable positions. Preferably, the links 16 have a length comparable to or slightly greater than the length of the posts 14. This allows the ladder to be spaced from the side edge of the tailgate 4 when in the operable condition so that the ladder does not strike the tailgate or interfere with the cable 28 connected between the tailgate and the truck bed side wall 30 as shown in FIGS. 2 and 3. In a preferred embodiment, the links 16 also have stops (not shown) which limit the pivotal movement of the links relative to the posts and the ladder legs relative to the links, so that the links do not rotate past a horizontal position relative to the posts as shown in FIG. 3 and the ladder does rotate past a position normal to the plane containing the open tailgate when the ladder is pivoted to the operable condition. Moreover, the links are "free floating" in that they allow the ladder to be arranged at various angles relative to the plane of the open tailgate, thereby to accommodate the tailgate being arranged at different heights relative to the ground.

The ladder steps 26 are preferably pivotally connected with the ladder assembly legs 20 via bearings 32, with cables 33 being provided to limit the pivotal movement of the steps relative to a horizontal position when the ladder assembly is in the operable position. When the ladder assembly is rotated to its stowed position shown in FIG. 1, the steps rotate to folded positions, respectively so that the ladder assembly 8 rests against the interior surface 6 of the tailgate 4 with the steps and legs being generally arranged in the same plane. Advantageously, the tailgate is provided with a well or depression (not shown) in the interior surface 6 thereof for receiving the ladder assembly in the stowed position. Such an arrangement prevents the ladder assembly from intruding on the interior space of the truck bed when the ladder assembly is in the folded condition.

In order to retain the ladder assembly in the stowed position, a latch mechanism 34 is connected with the tailgate interior surface at a spaced location from the mounting plate as shown in FIG. 2. The latch mechanism is shown more particularly in FIG. 4. It includes a latch 36 which is slidably connected with a base 38 connected with the tailgate via fasteners such as screws 40. A spring 42 biases the latch to a latching position. When the ladder assembly is pivoted to the stowed position, a cross member 44 of the ladder assembly connected between the ladder legs engages the latch which is displaced on engagement and then snaps to the latching position under operation of the spring 42. To release the ladder assembly, the user merely displaces the latch against the spring force to the release position and then pivots the ladder assembly to the operable position.

FIGS. 5 and 6 illustrate an alternate embodiment for the legs of the ladder assembly. In this embodiment, each leg 22 includes a telescoping section 46 extending from the bottom portion thereof. The leg and telescoping section contain a plurality of spaced through openings 48 and 50, respectively, with the spacing between the openings being the same in the leg and in the section so that the openings are in alignment when the telescoping section is displaced relative to the corresponding leg. A pin 52 or similar device is arranged in the aligned openings to lock the telescoping portion in position relative to the leg. With telescoping legs, the ladder assembly can be further adjusted to accommodate different size pick-up trucks having tailgates which are at different heights relative to the ground.

A further aspect of the pick-up truck accessory is the provision of a handle 54 pivotally connected with the side wall 30 adjacent to the tailgate 4 as shown in FIGS. 1, 2, 7, and 8. More particularly, a mounting plate 56 is connected with the side wall via fasteners such as screws 58. The mounting plate includes a post 60 which receives a cylindrical sleeve 62 at a lower end of the handle, the sleeve rotating about the post so that the handle may be pivoted between a stowed position adjacent to the side wall 30 as shown in FIG. 8 and an operable upright position shown in FIGS. 1, 2, and 7. A detent 64 is connected with the handle and adapted to engage a slot 66 in the mounting plate 56 to retain the handle in the operable position. The handle and mounting plate therefor may be made of the same materials as the ladder assembly.

To stow the handle, the user operates the detent 64 to disengage the slot so that the handle may be pivoted downwardly. Alternatively, a cable 68 may be connected between the handle detent and the tailgate as shown in FIG. 1 and a spring (not shown) is provided between the post and cylinder to bias the handle toward the stowed position. When the tailgate is lowered, the cable pulls the handle to the upright operable position. When the tailgate is raised, the handle is rotated by the spring to the stored position as shown in FIG. 8.

As shown in FIG. 9, the linkage assembly 18 of the ladder assembly 8 overlaps the mounting plate 56 for the handle 54 when the tailgate 4 is closed. This prevents the handle from being moved or removed from the truck bed when the tailgate is closed. This is particularly advantageous when the tailgate has a locking handle to prevent the tailgate from opening when the handle is locked.

With the ladder assembly and handle, a user can easily climb into the bed of a pick-up truck for loading and unloading items stored therein. The assembly is versatile and fits onto trucks of various sizes with tailgates at various distances from the ground.

While the preferred forms and embodiments of the invention have been illustrated and described, it will be apparent to those of ordinary skill in the art that various changes and modifications may be made without deviating from the inventive concepts set forth above.

What is claimed is:

1. An accessory for a pick-up truck having a tailgate which is operable between open and closed positions, comprising
   (a) a mounting plate connected with a side edge portion of an interior surface of the tailgate, said mounting plate including a pair of spaced rigid posts extending normal to the tailgate surface, said posts being arranged in a plane parallel to a longitudinal axis of the truck;
   (b) a ladder assembly including a pair of spaced parallel legs pivotally connected with said posts for movement between a stowed position wherein said ladder assembly rests against the tailgate interior surface and an operable position wherein said ladder assembly extends from said posts to the ground laterally of the truck; and
   (c) a pair of links pivotally connected at opposite ends between one of said posts and one of said ladder legs, respectively, said links spacing said ladder assembly from a side edge of the tailgate when the ladder assembly is on the operable position and arranging said ladder assembly at different angles relative to the tailgate in accordance with the height of the tailgate relative to the ground.

2. An accessory as defined in claim 1, wherein said links include stops to limit the pivotal movement of the ladder assembly to prevent the ladder assembly from pivoting beyond an angle normal to the tailgate to prevent said ladder assembly from striking the tailgate when in the operable position.

3. An accessory as defined in claim 2, wherein said links have a length corresponding with the length of said posts.

4. An accessory as defined in claim 1, wherein said ladder assembly comprises a plurality of spaced steps connected between said legs.

5. An accessory as defined in claim 4, wherein said steps are pivotally connected with said legs, said steps being pivoted to a position wherein said steps are parallel to the tailgate interior surface when said ladder assembly is in the stowed position.

6. An accessory as defined in claim 1, and further comprising a latching mechanism connected with the interior surface of the tailgate in a location spaced from said mounting plate for retaining said ladder assembly in the stowed position.

7. An accessory as defined in claim 6, wherein said latch assembly comprises a spring-biased latch which grips a cross bar of said ladder assembly connected between said legs.

8. An accessory a defined in claim 1, wherein said ladder assembly is adjustable in length for operation on pick-up trucks having tailgates spaced from the ground at different heights.

9. An accessory as defined in claim 1, and further comprising a handle connected with an interior rear portion of a side wall of the truck.

10. An accessory for a pick-up truck having a tailgate which is operable between open and closed positions, comprising
(a) a mounting plate connected with a side edge portion of an interior surface of the tailgate, said mounting plate including a pair of spaced rigid posts extending normal to the tailgate surface;
(b) a ladder assembly pivotally connected with said posts for movement between a stowed position wherein said ladder assembly rests against the tailgate interior surface and an operable position wherein said ladder assembly extends from said posts to the ground; and
(c) a handle connected with an interior rear portion of a side wall of the truck, wherein said handle is pivotally connected with said truck side wall for movement between an upright operable position when the tailgate is lowered to the open position and a horizontal stowed position when the tailgate is raised to its closed position.

11. An accessory as defined in claim 10, and further comprising a spring-biased hinge connecting said handle with said truck side Wall, said hinge normally biasing said handle toward its stowed position.

12. An accessory as defined in claim 11, and further comprising a cable connected between said handle and the tailgate for raising said handle to the upright position when the tailgate is lowered.

13. An accessory as defined in claim 10, wherein said linkage assembly extends across a portion of said handle when said handle and said ladder assembly are in their stowed positions and the tailgate is in the closed position.

* * * * *